No Printed Specification Available
6061X
J. Goulding.
Loom.
Patented Jul. 7, 1830.
No. 4.
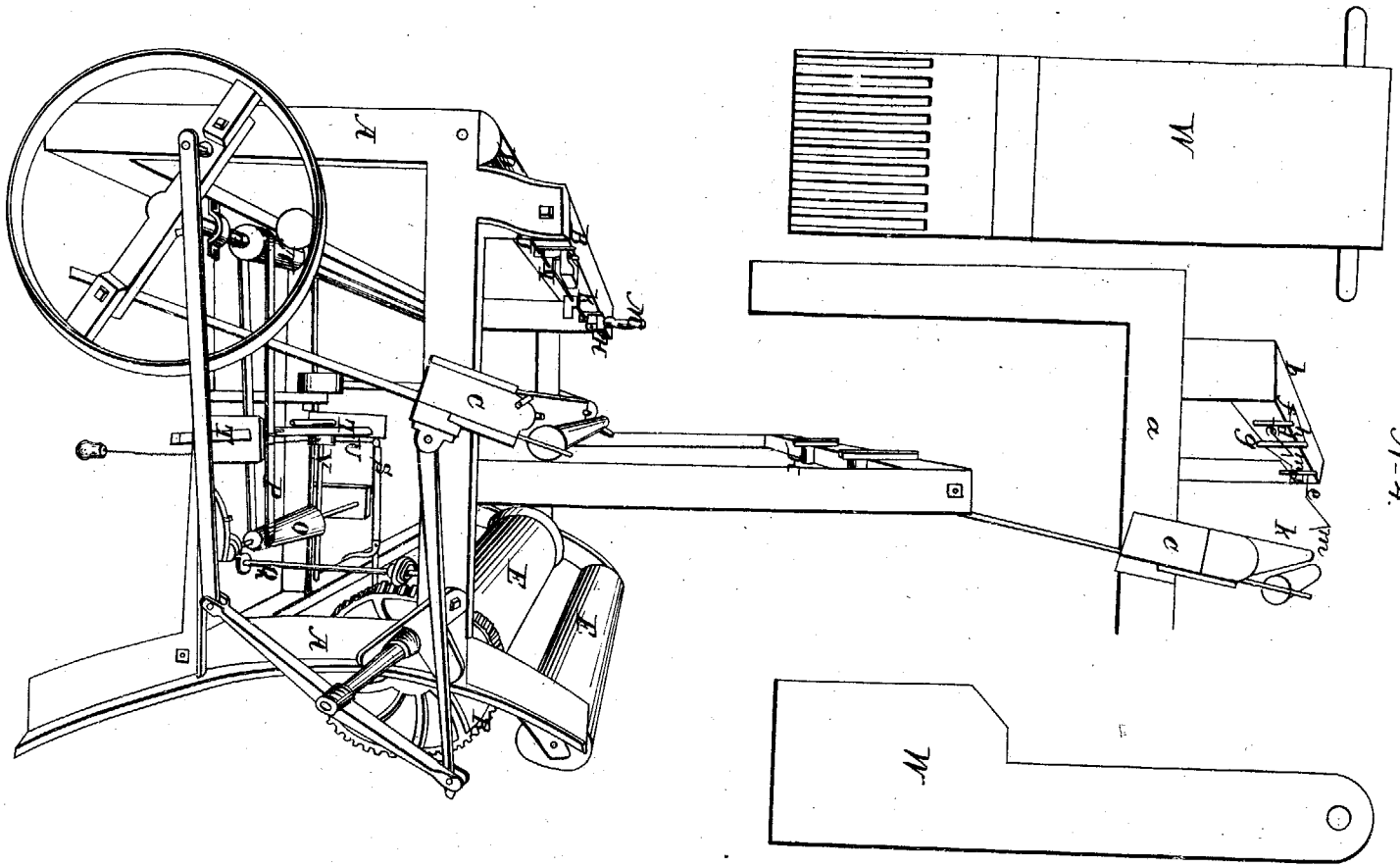
N. PETERS, PHOTO-LITHOGRAPHER, WASHINGTON, D. C.

John Goulding

Letters Patent. Dated July 7. 1830.

(The Schedule referred to in these Letters Patent and making part of the same, containing a description in the words of the said John Goulding himself of his Improvement in the mode of making and using Looms.

Be it Known that I the said John Goulding, have invented constructed, made and applied to use, a new and useful improvement in the mode of making and using looms for weaving.

The particular improvement is set forth in the schedule and drawings annexed, that is to say, AA. is the Frame, B is a breast Beam, C. Lay or beater. D. Cloth Beam. E. Yarn Beam. F. Back beam or roller for Cloth to pass over. G main Arbour to Loom HH two teeth blocks of wood or metal, these blocks are shown in full size at WW. Those blocks are hung by means of two upright pieces by male and female centres as shewn. Those upright pieces are fastened to the rod I, that passes across the loom to hold the other blocks, the other side of the loom between the breast beam and lay. There is a Reed with twelve or more dents, placed the same distance apart, as those teeth in blocks HH. these reeds are placed in the lay at the outer side of the cloth on each side and the blocks placed directly in front, so as to pass freely between the slits in the reed, where the lay or beater comes up where the cloth is made, those teeth are made to pass in through the Reed Drawing

7/7/1830 6061X

3554 nearly one inch if there is no obstruction. The obstruc-
tion if any will be the filling or weft as the shuttle
passes through the web into the box, in that case
the filling will come between the Blocks and Reeds
and will carry the Blocks forward with the Lay; in so
doing it carries forward the upright pieces I I they being
attached to the Rod J. it turns that and there being a
lever attached to it at K, a small lever L goes through
the end of K. lifts it up so as to prevent it hitting an
iron placed in the lay for that purpose, provided there
is no filling passes from the shuttle, the blocks pass
freely into those Reeds, they not being carried back pre-
vents the lever being lifted up over the Iron on the
lay, likewise the end of the lever hits and the Lay
carries it forward, in so doing it strikes at the other
end a knee or lever, that is connected with the
handle M, so it throws the loom out of gear and
it stops it by the Lays not carrying up those blocks.
These blocks are placed so as to clear the top of Race
board, they are held up at one end by I I, and at
a little distance rest on a piece of Iron made fast
to the Breast Beam so as to keep them in a horizon-
tal position but yet hangs so as to work backward
and forward horizontally freely by the motion of the
lay, if the filling is at either side supplied by the
Shuttle should the filling be found to drop below
those blocks, there may be a small plate of Iron
or wire pass from the under side of the blocks
over the top of the Lay or Race board through one
of those partings in the Reed, so that when the Lay
comes up. it will raise the weft up between the
blocks and Reed. This piece must pass into the Race board of the lay so that the shuttle may pass
over it freely. If the Lay should not come up accurate-
ly, there must be a support at each side of the lay to
bring it into the proper place; when it arrives at the
place where those blocks enter the Reeds.

In figure No 4. a Loom frame. b is a breast beam
c Lay or beater dd. upright pieces of Iron fastened
to the breast beam, at each end with a pivot so as to
turn freely. ee is a small wire fastened to d d, so as the
ends m, m, can rise and fall freely. these ends m, m,
that turn downwards is for the purpose of the weft or
filling to wind around when the shuttle passes across
the web; by the yarns winding round it draws the wire
up to the selvage or edge of the cloth; in so doing it turns
in its centre, turns f f. draws h. connecting wire. h.
being attached to g. draws or turns g. so as to prevent K
from hitting g. when the Lay comes up to where
the cloth is made, now providing there is no fil-
ling or weft in the shuttle it will prevent m. from
being drawn up to the selvadge; likewise prevents
f from being moved. f not being moved g. does
not move, so when the lay comes up to where the
cloth is made or nearly up, K will strike g. ^at the Consequence [illegible] drive g
forward and hit a knee that is connected with
the handle of the loom, that stops and starts, the
loom; in so doing the loom will be stopped. g.
hangs on a pin in the centre so that it can vibrate
fore and aft. and backwards and forwards d. must
have a spring attached to it, so as to incline it from
the edge of the cloth, when the weft is wound
round the wire at m, the lay or beater comes up,
the Race board strikes the wire e two inches from m, and raises it up and liberates the end m,
from the weft, when the Lay returns back again this
falls into its proper place again. the ends m, must fall
about half an inch forward to where the cloth makes,
likewise one inch or more from the selvadge or
list of the cloth.

N is a small cone drum, on the main arbor that
has a band P which passes round it and round
another cone drum on the arbor. O. Arbor O, has
a worm in the outer end and gears into the shaft Q,
shaft Q has a worm that takes into wheel R, on
the yarn beam. these cone drums are for the pur-
pose of regulating the yarn coming off the beam,
the band is shifted in the same ratio that the yarn
lessens the size of the beam. to increase the mo-
tion of the beam it is done by a Lever S that has
a bearing at one end against the beam, and the
other end is a chain attached to it, and from thence
down to a pulley on the arbor V. a chain is attach
to another pulley on the arbor V and thence to slide T,
Slide T has two guide pins, that guide the band P, Slide
T has a weight X. that brings up the lever S against
the yarn beam. This lever S has a bearing in the
middle or nearly as the proportion of other parts may
require; there may be a shift gear on shaft Q at bottom
that plays into the worm on shaft O, so as to give any
number of pieces of weft in an inch required.

What I claim as my invention and for which I
herein claim Letters Patent, is the method herein
described by which it may be ascertained if the
filling or weft break while running off from the
bobbins or the bobbins deliver all off, and by which ever case of it is breaking or running off, the loom will be stopped by the apparatus above specified.

In testimony that the above is a true specification of my said improvement as above described, I have hereunto set my hand and seal this sixth day of May in the year of our Lord One thousand eight hundred and thirty Witnesses
Geo Alden
James Richardson John Goulding (Received and Recorded a new February 24. 1844.)